US 6,576,028 B2

(12) United States Patent
Santos

(10) Patent No.: US 6,576,028 B2
(45) Date of Patent: Jun. 10, 2003

(54) NOISE ABATEMENT DEVICE AND SEPARATION AID FOR USE IN FLUID FLOW SYSTEMS

(76) Inventor: Miguel Radhamés Santos, 11 Phillipsport Rd., Wurtsboro, NY (US) 12790

( * ) Notice: Subject to any disclaimer, the term of this patent is extended or adjusted under 35 U.S.C. 154(b) by 0 days.

(21) Appl. No.: 09/975,914

(22) Filed: Oct. 12, 2001

(65) Prior Publication Data

US 2003/0070553 A1 Apr. 17, 2003

(51) Int. Cl.[7] .......................... B01D 45/04; F01N 7/00
(52) U.S. Cl. .......................... 55/320; 55/432; 55/462; 96/384; 181/239
(58) Field of Search .................. 96/384; 55/462, 55/432, 433, 428, 320, DIG. 23; 181/239, 269

(56) References Cited

U.S. PATENT DOCUMENTS

| | | | | |
|---|---|---|---|---|
| 310,654 A | * | 1/1885 | DeWitt .................. | 181/239 |
| 773,984 A | * | 11/1904 | Richard ................. | 181/239 |
| 2,163,095 A | | 6/1939 | Kopp .................... | 183/2.7 |
| 2,493,095 A | | 1/1950 | Williams ................ | 183/2.7 |
| 3,606,737 A | | 9/1971 | Lefevre ................. | 55/319 |
| 3,771,292 A | | 11/1973 | Hamilton et al. ......... | 55/345 |
| 4,565,554 A | | 1/1986 | Zipay et al. ............ | 55/185 |

FOREIGN PATENT DOCUMENTS

JP    59-217491 A    * 12/1984

* cited by examiner

Primary Examiner—Robert A. Hopkins
(74) Attorney, Agent, or Firm—Sandra M. Kotin

(57) ABSTRACT

A device to be interposed within the conduit of a fluid flow system to reduce or eliminate the noise associated with such systems. The device is made up of at least two cylindrical chambers, one within the other. The inner chamber is closed at the top, has a fluid entry port at the bottom, and a plurality of fluid exit nozzles symmetrically arranged about the side wall. The outer chamber is closed at the bottom and has a fluid exit port at the top. The entry port, exit port and inner chamber as well as the fluid flow system conduit have the same internal cross sectional areas. The sum of the cross sectional areas of the exit nozzles is equal to the cross sectional area of the conduit. The addition of a liquid exit port at the bottom of the outer chamber allows the device to also function to separate a gas from a fluid mixture. Multiple units may be utilized within a fluid flow system.

40 Claims, 6 Drawing Sheets

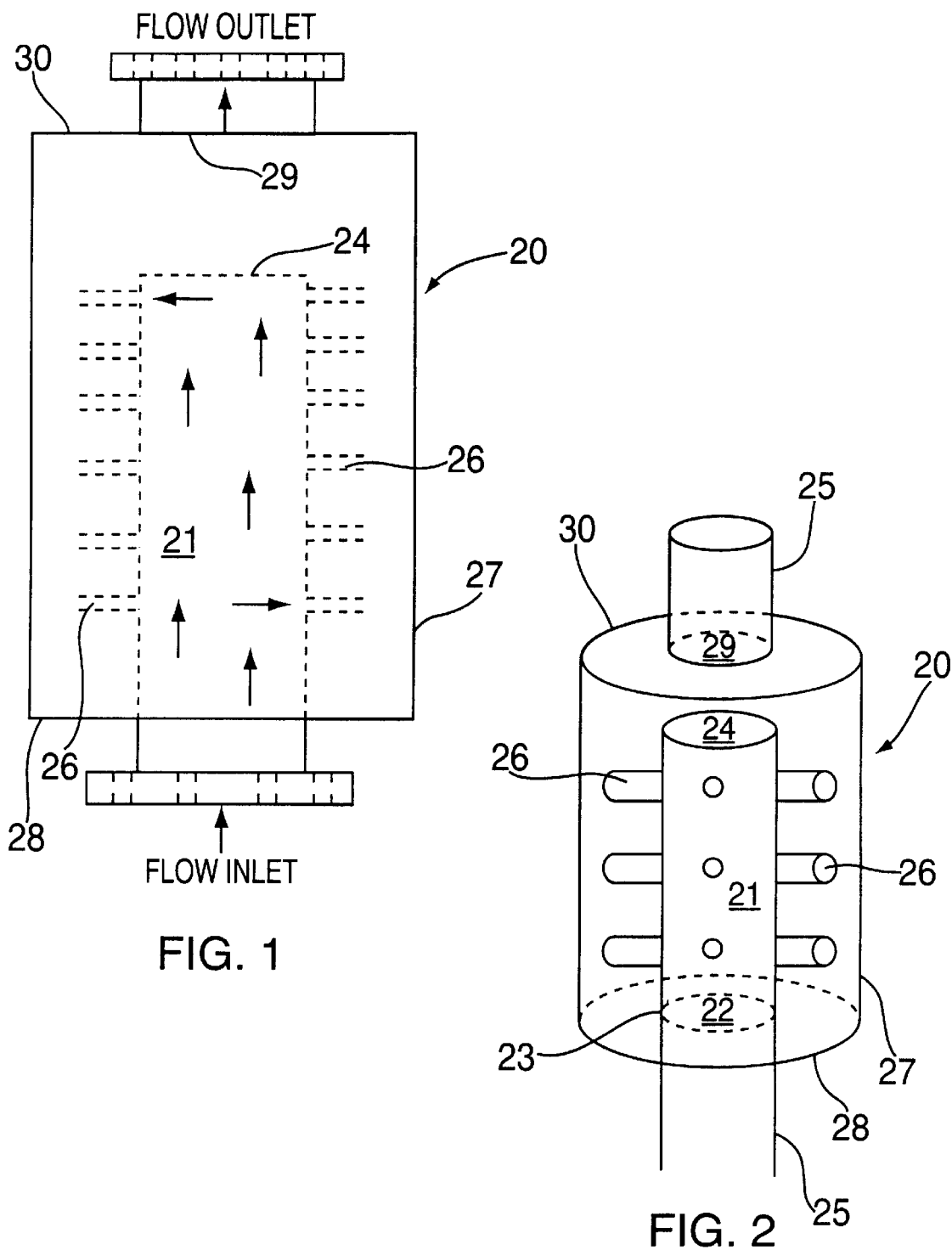

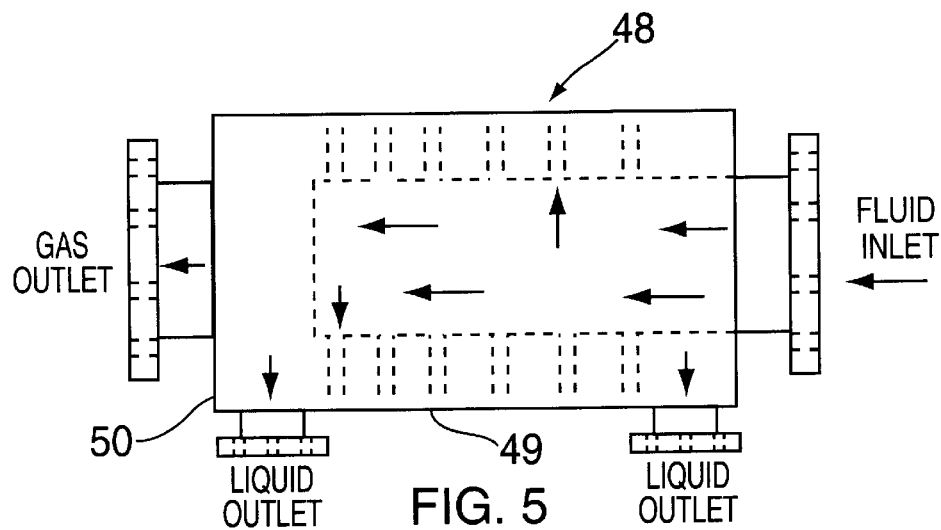
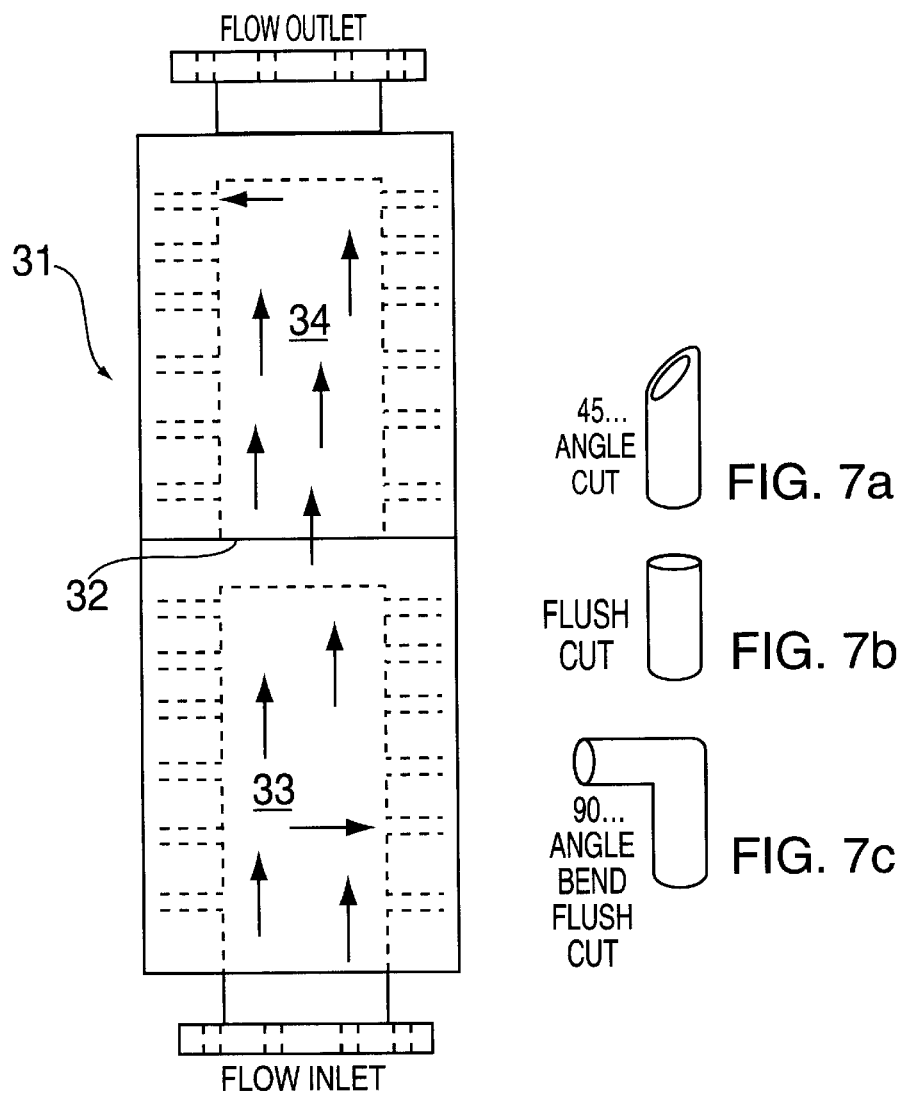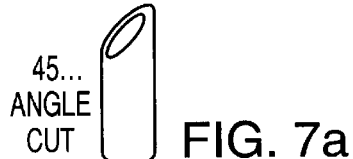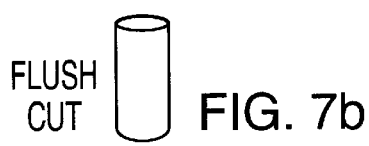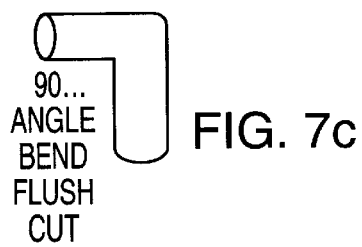

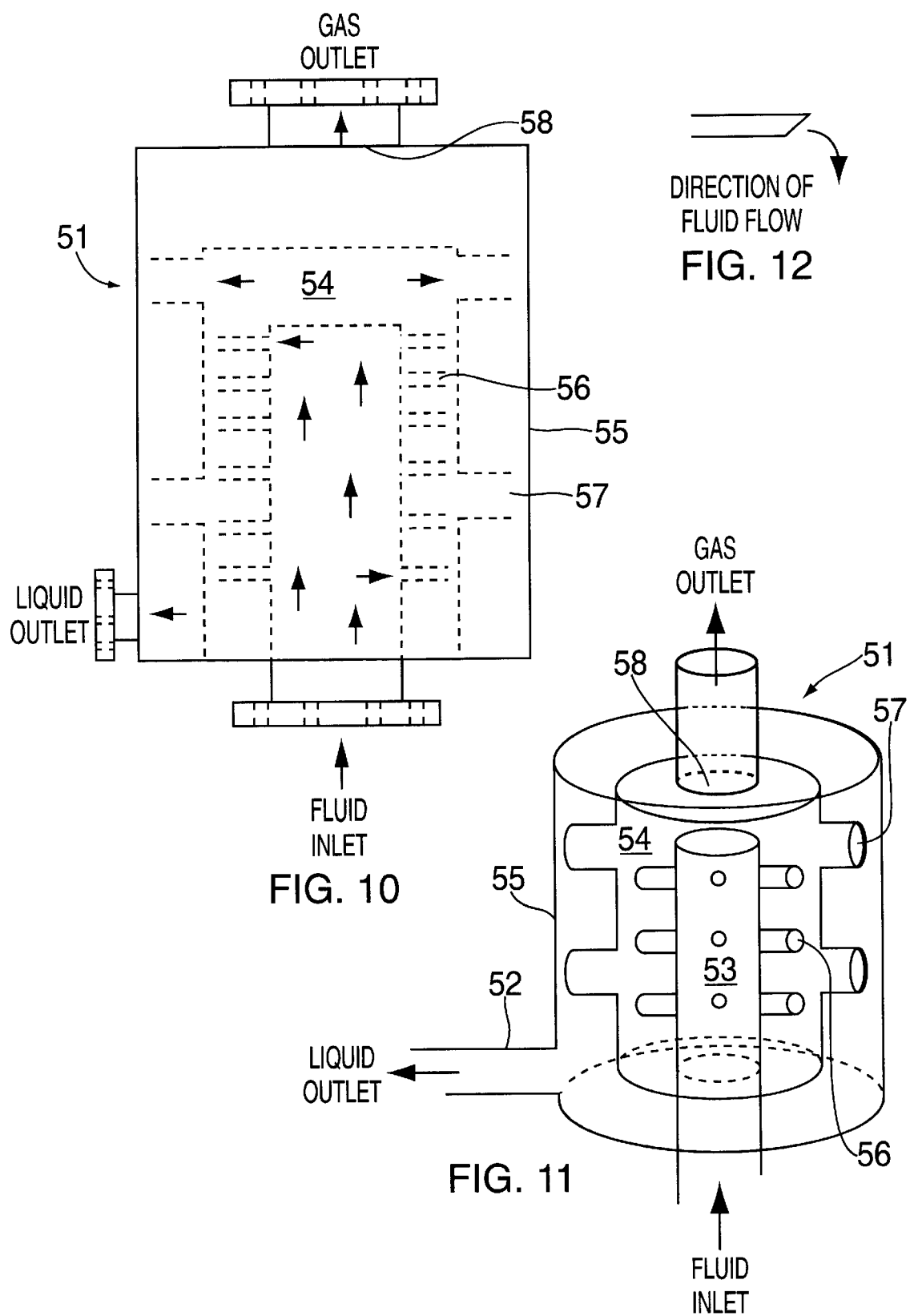

NOISE ABATEMENT DEVICE AND SEPARATION AID FOR USE IN FLUID FLOW SYSTEMS

FIELD OF THE INVENTION

The instant invention relates to a device that can be interposed within a fluid flow system for the abatement of the noise usually associated with such systems and which may be modified to effect the separation of a gas from a fluid mixture.

BACKGROUND OF THE INVENTION

There is usually a considerable amount of noise associated with systems through which fluids are flowing, especially when the systems are under high pressure, under vacuum conditions and when the system is used as a steam conduit. The more complex the system, the more noise may be generated. It is becoming more prevalent for workers to complain about conditions in the work place that can cause harm to the person. Noise pollution, though not new, is finally coming into its own as a problem in the work place. The usual means used to diminish noise in fluid flow systems is to insulate the conduits. Depending upon their location, length and configuration, insulation may not be easy to accomplish. Another possibility is to shorten the conduits, but while limiting the conditions that produce the noise this may not be practical. To date there are no devices that can merely be interposed into a fluid flow system to alleviate or to at least greatly diminish the noise generated therefrom without creating any significant changes to the system.

There have been a variety of means used to separate components of fluid mixtures. When all of the components of a fluid mixture are liquids, various fractionation techniques are used to effect separation of those components. When gases and liquids are part of a fluid mixture the separation of the gases may be achieved by means other than fractionation.

U.S. Pat. No. 2,163,095 to Kopp discloses an oil and gas separator such as may be used to receive crude oil. A vertically oriented cylindrical main tank is fitted, in its upper area, with at least one concentric internal cylinder. The crude oil enters into the main tank at about mid level and is directed by means of louvers or deflectors about the inner wall in a clockwise direction. The fluid can thereafter pass into the interior cylinders through louvered openings such that it also swirls around the walls in a clockwise direction. The gas separates from the mixture and rises to an exit port at the top of the main tank while the remaining liquid falls downward and collects at the bottom of the main tank where it can be removed through a drain outlet.

Williams, in U.S. Pat. No. 2,493,095 also discloses an oil and gas separator. Crude oil enters a main cylindrical tank at about mid level and is deflected about the inner wall by a hood or deflector over the entry port which causes the gas to rise and the remaining liquid to fall downward and collect in a pool at the bottom of the tank. The rising gas enters a mist extractor where it is directed by means of a series of baffles through annular channels and finally into a central gas discharge pipe.

Solid and liquid particles dispersed in a gas can be removed using an apparatus disclosed by Lefevre in U.S. Pat. No. 3,606,737. Two vertical cylindrical tanks are connected at their upper areas by means of a gas outlet. Both tanks contain central tubes having a series of condensing elements arranged in radial and vertical symmetry. The mixture enters the first tank through an inlet tube in the bottom and passes upward into the central tube where liquid particles are trapped in the condensing elements and the gas exits through the elements and passes into the second tank. There it passes through filters into the central tube through which the clean, dry gas is directed out of the apparatus.

A similar function is achieved by the apparatus disclosed by Hamilton et al. in U.S. Pat. No. 3,771,292 which is designed to clean and dry air in a compressed air line. The air is directed into a series of horizontal chambers where it is passed, in each chamber, through a screen which removes both solid and liquid particles. The swirl pattern of the moving air is changed by angled elbow ports as it moves from chamber to chamber. An odd number of chambers insures that the exiting air moves in the same direction as the air entering the system. Drains in the bottom of each chamber remove the solids and liquids filtered from the air.

In U.S. Pat. No. 4,565,554, Zipay et al. teaches an apparatus for the separation of a liquid from a vapor, more specifically, water from steam in a steam generator. Several separator units are mounted within a large steam drum. The steam-water mixture flows upward into a central cylindrical passageway in each separator. The mixture then moves upward past a twisted baffle then spiral arms which direct it against the walls of an internal cylinder. The water is separated out and falls downward while the steam rises into a second stage where a series of plates cause additonal water to condense out. The steam then passes through a dry box and out of the separator.

All of the prior art devices teach means for the separation of the components of a variety of fluid mixtures. Most do not maintain a constant pressure in the fluid flow system and none of the prior art devices address the issue of the noise generated in such systems. There is a need for a means to at best eliminate and at least diminish the noise associated with fluid flow systems. There is a need for a simple and cost effective way to address the noise issue while still maintaining such systems at constant pressure. There is also a need for a simplified system for the separation of a gas from a fluid mixture without having to redesign the entire system, while eliminating the noise generated by the fluid flow in the same operation.

BRIEF SUMMARY OF THE INVENTION

The present invention may be a device that may be interposed into a fluid flow system without disrupting the integrity of the system itself. The device may permit the fluid to flow through the system, maintain the pressure of the system, and decrease or eliminate the noise that most often accompanies long fluid conduits. If the fluid consists of a gas mixed with a liquid and it is desired to separate the components, a modification of the device may effect such a separation.

It is an object of the present invention to provide a device that can eliminate the noise associated with fluid flow systems.

Another object of the present invention is to provide a device that can be modified to effect a separation of a gas from a fluid mixture and still diminish the noise generated within the system.

A further object of the present invention is to provide a device that does not cause a diminution of the pressure within the system.

Another object of the present invention is to provide a device that has no moving parts and therefore will not show wear over long periods of use.

A still further object of the present invention is to provide a device that can easily be installed, will not disrupt the system in any way, and will maintain the system's integrity.

Another object of the present invention is to provide a device that can be installed anywhere in a fluid flow system where access may be found.

A further object of the present invention is to provide a device that is maintenance free.

A still further object of the present invention is to provide a device that is not expensive and is not difficult to manufacture.

A noise abatement device for use within a fluid flow system comprises a first chamber having a proximal end and a distal end and being closed at its distal end and having an entrance port in its proximal end for the introduction of the fluid from the fluid flow system. There is a plurality of exit nozzles extending horizontally from the exterior of the first chamber for the exit of the fluid. A second chamber, larger than the first chamber and containing the first chamber, has a proximal end and a distal end, is closed at the proximal end, and has an exit port in the distal end for the removal of the fluid. As the fluid enters the first chamber through the entrance port and leaves the first chamber through the exit nozzles it is caused to be dispersed and to strike the interior wall of the second chamber where it is further dispersed and finally leaves the second chamber through the exit port where it re-enters the fluid flow system. The dispersing of the fluid causes a change in the dynamics thereof thus reducing any noise that may have resulted from the fluid flow.

A noise abatement device for use within a fluid flow system comprises a first chamber having a proximal end and a distal end and being closed at its distal end and having an entrance port in the proximal end for the introduction of the fluid from the fluid flow system. There is a plurality of exit nozzles extending horizontally from the exterior of the first chamber for the exit of the fluid. There is a second chamber, larger than the first chamber and containing the first chamber, the second chamber having a proximal end and a distal end and being closed at the proximal end and having an exit port in the distal end for the removal of the fluid from the second chamber. There is also a third chamber disposed at the distal end of the second chamber and having a proximal end and distal end with an opening in the proximal end contiguous with the exit port of the second chamber to receive the fluid from the second chamber, and being closed at the distal end. There is a plurality of exit nozzles extending horizontally from the exterior of the third chamber for the exit of the fluid. A fourth chamber is adjacently disposed to the second chamber, is larger than the third chamber, and contains the third chamber. The fourth chamber has a proximal end and a distal end, is closed at the proximal end and has an exit port in the distal end for the removal of the fluid from the fourth chamber. As the fluid enters the first chamber through the entrance port and leaves the first chamber through the exit nozzles it is caused to be dispersed and to strike the interior wall of the second chamber where it is further dispersed and thereafter leaves the second chamber through the exit port and enters the third chamber from which it leaves through the exit nozzles. It is further dispersed and strikes the interior wall of the fourth chamber where it is still further dispersed and finally leaves the fourth chamber by the the exit port and re-enters the fluid flow system. The dispersing of the fluid causes a change in the dynamics thereof thus reducing any noise that may have resulted from the fluid flow.

A device for use within a fluid flow system to reduce the noise associated with such fluid flow systems and to separate gas components from liquid components comprisies a first chamber having a proximal end and a distal end and being closed at its distal end with an entrance port in the proximal end for the introduction of the fluid from the fluid flow system. There is a plurality of exit nozzles extending horizontally from the exterior of the first chamber for the exit of the fluid. A second chamber, larger than the first chamber and containing the first chamber has a proximal end and a distal end, is closed at the proximal end, and has an exit port in the distal end for the removal of the gas components from the second chamber. There is at least one liquid drain in the second chamber for the removal of the liquid components. As the fluid enters the first chamber through the entrance port and leaves the first chamber through the nozzles it is caused to be dispersed and to strike the interior wall of the second chamber where it is further dispersed causing the gas components to become separated from the liquid components such that the gas components leave the second chamber through the exit port and re-enter the fluid flow system. The liquid components leave the second chamber through the liquid drain. The dispersing and separation of the components of the fluid causes a change in the dynamics thereof thus reducing any noise that may have resulted from the fluid flow.

A device for use within a vacuum system through which to bleed air into the vacuum system and to reduce the noise associated with such system. The device has a first chamber with a proximal end and a distal end, is closed at its proximal end, and has an air inlet at its distal end. There is a second chamber, smaller than the first chamber such that the second chamber is contained within the first chamber. The second chamber has a proximal end and a distal end, is closed at the distal end, and has a plurality of nozzles extending horizontally from the exterior of the second chamber for the introduction of the air into the second chamber. There is an air exit conduit in the proximal end of the second chamber for the exit of air from the second chamber and for the introduction of the air into the vacuum system. A valve situated within the air exit conduit controls the amount of air permitted to enter the vacuum system. The air enters the first chamber through the air inlet, enters the second chamber through the nozzles, and leaves the second chamber through the air exit conduit and through the valve causing a change in the dynamics of the air flow and thus reducing noise that may have resulted therefrom.

A device for use within a steam generating system to reduce the noise associated with such systems has a first chamber with a proximal end and a distal end, and has both ends closed by panels which are reversibly expandable under conditions of variable temperature and pressure. A second chamber, situated at the proximal end of the first chamber and being smaller than the first chamber such that the second chamber is contained within the first chamber has a proximal end and a distal end and is closed at the distal end. There is a steam inlet at the proximal end of the second chamber for introduction of steam into the second chamber and a plurality of nozzles extending horizontally from the exterior of the second chamber for the exit of the steam from the second chamber. A third chamber is situated at the distal end of the first chamber and is smaller than the first chamber such that the third chamber is also contained within the first chamber. The third chamber has a proximal end and a distal end, is closed at the proximal end, and has a plurality of nozzles extending horizontally from the exterior of the third chamber for the introduction of the steam into the third chamber. A steam exit is located at the distal end of the third chamber for removal of steam from the third chamber. The steam enters the second chamber through the steam inlet, leaves the second chamber through the nozzles, enters the first chamber where the pressure of the steam flow is equalized by means of the panels, leaves the first chamber, enters the third chamber through the nozzles, and leaves the third chamber through the steam exit. These steam transfers cause a change in the dynamics of the steam flow thus reducing any noise that may have resulted from the steam flow.

These and other features and advantages of the invention will be seen from the following description and drawings wherein similar reference characters are used to designate corresponding parts in all views.

BRIEF DESCRIPTION OF THE DRAWING

FIG. 1 is a schematic diagram of the basic noise abatement device in vertical orientation;

FIG. 2 is a three dimensional schematic view of the device of FIG. 1;

FIG. 5 is a schematic diagram of the noise abatement and gas separation device in horizontal orientation;

FIG. 6 is a schematic diagram of a double unit in vertical orientation, one above the other, for noise abatement;

FIG. 7a is a perspective view of a nozzle end cut in a 45° angle;

FIG. 7b is a perspective view of a nozzle end flush cut;

FIG. 7c is a perspective view of a nozzle with a right angle bend and flush cut end;

FIG. 10 is a schematic diagram of a double unit (one within the other) in vertical orientation for noise abatement and gas separation;

FIG. 11 is a three dimensional view of the device of FIG. 10;

FIG. 12 is a side view of an angle cut nozzle;

DETAILED DESCRIPTION OF THE INVENTION

Figure 3:
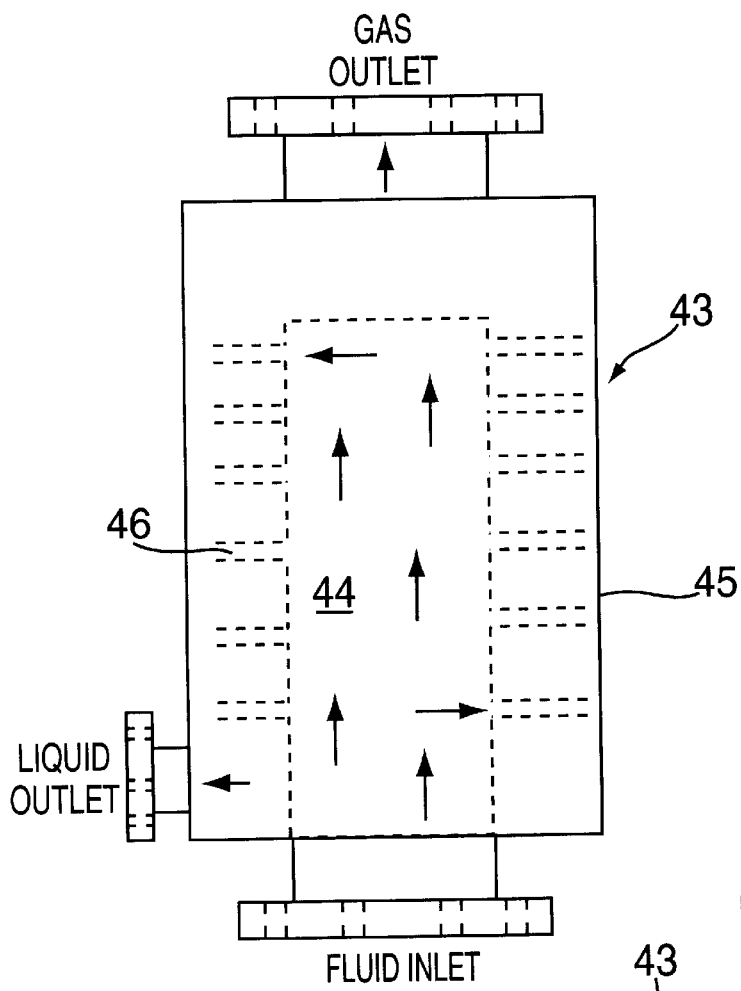
FIG. 3 is a schematic diagram of the noise abatement and gas separation device in vertical orientation.

The basic noise abatement device 20 of the instant invention as seen in FIGS. 1 and 2 may be a dual chambered unit that may be interposed into the main conduit 25 of a fluid flow system. A first chamber or inner cylinder 21 may be of the same diameter as the conduit and may have an opening 22 of the same diameter at the bottom or proximal end 23 that may be contiguous with the conduit 25. The top or distal end 24 of the inner cylinder 21 may be closed. Symmetrically spaced about the external wall of the inner cylinder 21 may be a series of nozzles 26 extending at right angles from the wall. There may be a second or outer cylinder 27, which may be larger than and completely contain the inner cylinder 21. The bottom or proximal end 28 of the outer cylinder 27 may be closed except that the opening 22 connection to the conduit 25 may pass through the proximal end 28. There may be an exit port 29 at the distal end 30 of the outer cylinder 27 through which the fluid exits and re-enters the conduit 25. The diameter of the exit port 29 may also be equal to that of the conduit 25.

The fluid may enter the device 20 through the entrance port 22 in the proximal end 23 of the inner cylinder 21. It may move through the inner cylinder 21 and may exit through the series of nozzles 26 into the outer cylinder 27 where it may be forcefully thrust against the inner wall and may be caused to be dispersed into small droplets before it exits the outer cylinder 27 through the exit port 29. Though the device 20 is shown in vertical orientation in FIGS. 1 and 2, it may just as easily be used horizontally or at any angle dictated by the fluid flow conduit into which it may be interposed.

The pressure within a fluid flow system may cause stresses within the system which in turn generate a great deal of noise. The greater the pressure the more stress and the more noise that may be generated. The device of the instant invention is based on the concept that the fluid dynamics may be changed as the fluid passes through the device 20 and with that change the stresses within the system may be reduced as may be the noise. The sum of the cross sectional areas of the nozzles 26 must be at least equal to or may be greater than the cross sectional area of conduit 25 of the fluid flow system and of the internal cylinder 21 since they may be the same. When those dimensions are maintained the result may be to reduce the stress and thereby to reduce, or eliminate, the noise.

The dimensions of the device to be used in a particluar fluid flow system may be determined by the cross sectional area of the conduit of the system in which it is to be installed. The interior diameter of the conduit 25 and the interior diameter of the nozzles 26 are the basis for the calculations. If the sum of the cross sectional areas of the nozzles is at least equal to the cross sectional area of the conduit, the pressure within the system will remain constant even as the fluid dynamics changes as the fluid passes through the device 20. The interior diameter of the nozzles may be dictated by the material available for construction of the device and the method of manufacture. The nozzles may typically have a diameter of ½ in (⅓ cm), ⅜ in (0.95 cm) or ¼ in (0.64 cm). The number of nozzles needed for the inner cylinder may thereafter be determined from the diameter of the conduit and the diameter of the nozzles as follows:

Ac=cross sectional area of the conduit DC=internal diameter of the conduit

An=cross sectional area of each nozzle Dn=internal diameter of the nozzle

Nz=number of nozzles needed $Ac \leq \Sigma_{Nz} An$ $$Ac = \frac{\pi(Dc)^2}{4} \qquad An = \frac{\pi(Dn)^2}{4}$$

For a system with a 6 in. (15 cm) diameter conduit and a 0.5 in. (1.3 cm) diameter nozzle:

$$Ac = \frac{\pi(6)^2}{4} = 28.26 \text{ in}^2 \qquad An = \frac{\pi(0.5)^2}{4} = 0.20 \text{ in}^2$$

$$Nz = \frac{Ac}{An} \qquad Nz = \frac{28.26 \text{ in}^2}{0.20 \text{ in}^2} = 141 \text{ nozzles}$$

From this calculation it may be seen that the number of nozzles needed may be equal to or greater than 141. If this number is not a whole number or if it will not lend itself to a symmetrical arrangement of nozzles, the next highest whole number that will result in a symmetrical arrangement may be selected. In this case let Nz=144 nozzles.

The nozzles may be uniformly spaced about the exterior surface of the inner cylinder, that is, the arrangement may be both longitudinally and radially symmetrical. The number of nozzles placed at each level may be chosen for convenience of manufacture and may be used to determine the number of rows needed in the arrangement.

For this calculation let Nz=144 nozzles and assume 8 nozzles spaced 45° apart in each circumferential level.

Nc=the number of nozzles in each circumferential level
Nr=the number of rows or levels needed $$\frac{Nz}{Nc} = Nr \qquad \frac{144}{8} = 18 \text{ rows of nozzles}$$

Thus in the design of the device for use in system having a 6 in (15 cm) interior diameter conduit and 0.5 in (1.3 cm) interior diameter nozzles, there may be 8 nozzles at 45° intervals in each circumferential level or row and there may be 18 rows. The distance between the nozzles and the rows may be determined by the material used to make the device and any manufacturing constraints in the use of that material. If the rows are designed to be 2 in (5 cm) apart, the interior cylinder must be at least 39 in (99 cm) long so that there may be at least 1.5 in (3.8 cm) between the first and last row of nozzles and the ends of the interior cylinder.

There may be a variety of nozzle designs compatible with the instant invention. Two may be straight nozzles where the ends may be cut differently, and a third may be a nozzle having a right angle bend. A simple flush cut nozzle, FIG. 7b, may be useful in most situations, and may cause the exiting fluid to strike the opposing wall directly and with full force. The angled cut nozzle, FIG. 7a, may direct the exiting fluid in a particular direction, and may act to diminish the force of fluid when striking the opposing wall. The angle cut nozzle may also be more effective in eliminating blockage at the nozzle ends since the actual opening may be larger than the flush cut end. This may be an important consideration when very small diameter nozzles are used. The third type of nozzle may have a right angle bend and a flush cut end, FIG. 7c. The right angle bend nozzle may be used when it is necessary that the exiting fluid not be directed against the opposing wall, and may be directed in a specific direction. This type of nozzle may be used only in extreme conditions where a very specific result is desired.

Another important consideration in the design of the device may be the closeness of the ends of the nozzles 26 to the interior wall of the outer cylinder 27. The nozzles 26 should not be so close to that wall that the pressure or flow of the fluid is restricted. For flush cut nozzles, FIG. 7a, a minium distance from the end of the nozzle to the wall may be calculated.

Assume that there may be an imaginery cylinder reaching from the end of a nozzle 26 to the wall. The surface area of the inside of this cylinder may be at least equal to the internal cross sectional area of the nozzle. This would also be equal to the surface area that the fluid would contact if it is in direct contact with the wall, which may be $$An = \frac{\pi Dn^2}{4}$$

If this imaginary cylinder is opened and laid flat it would be a rectangle with an area equal to the length times the width. The width of such a rectangle may be the circumference of the cylinder (C=πDn) and the length (L) the distance from the end of the nozzle to the wall.

Therefore, $$An = \frac{\pi Dn^2}{4}$$

and An=πDn×L; then $$\frac{\pi Dn^2}{4} = \pi DnL$$

$$\text{and} \quad L = \frac{\pi Dn^2}{4\pi Dn}; \qquad L = \frac{Dn}{4} = \frac{Rn}{2}$$

Since Dn is the internal diameter of the nozzle 26, Rn would be the internal radius of the nozzle 26. Therefore, the minium distance from the end of the flush cut nozzle to the wall of the outer cylinder may be one half the internal radius of the nozzle 26. If the nozzle end is cut at an angle (see FIG. 7b) the end can be closer to the wall, but must never touch the wall. It may be recommended for a particular system that the nozzles be cut at an angle to decrease the possibility of blockage, or to direct the fluid flow in a particular direction.

The size of the outer cylinder 27 may also be a consideration. The available volume (V2) of the outer cylinder may be equal to or greater than the volume of the inner cylinder (V1), that is V2≧V1. A typical device may have the diameter of the outer cylinder to be twice the diameter of the inner cylinder. The height of the outer cylinder must also be considered carefully. There must be sufficient distance between the top 24 of the inner cylinder 21 and the exit port 29 of the outer cylinder 27 so that the fluid flow may not be impeded. A minimum distance may be 3 in (7.6 cm), but a distance of 6 in (15 cm) may provide a better result.

Again the 6 in conduit may be used as the example. As noted above, the height (H1) of the inner cylinder 21 may be 39 in (99 cm) and the internal diameter, 6 in (radius 3 in; 7.6 cm), the same as the conduit. The internal diameter of the outer cylinder 27 may be twice that of the inner cylinder or 12 in (radius 6 in; 15.2 cm). Let V3 be the actual volume of the outer cylinder taken alone. The height of the outer cylinder (H2) may be 45 in (114 cm).

The volume of a cylinder, Vc=πR²H
R1=radius of inner cylinder=3 in R2=radius of outer cylinder=6 in
V1=π(3)²(39)=1102 in³
V3=π(6)²(45)=5087 in³ V2=V3−V1
V2=5087−1102=3985 in³

From this calculation it may be seen that the available volume of the outer cylinder 27 is considerably greater than that of the inner cyinder 21. In this calculation the volume of the nozzles, which is negligible, has not been used.

The diameter of the outer cylinder 27 may be twice the diameter of the inner cylinder, as noted above, but it may be somewhat smaller as long as the total available volume is at least equal to the volume of the inner cylinder 21 and the distance from the the ends of the nozzles 26 to the wall of the outer cylinder 27 conforms to the specification as noted above.

When designing a noise abatement device for a particluar fluid flow system three factors may be considered. First, the cross sectional area of the conduit of the fluid flow system, since this dimension determines the cross sectional area of the inner cylinder and the minimum sum of the cross sectional areas of the nozzles. Second, the number of nozzles and their arrangement, because this will dictate the length of the inner cylinder and from that the minimum length of the outer cylinder. The material used and the method of manufacture may actually determine the size and number of nozzles. The third factor is the size of the outer cylinder, since this is a variable. A larger outer cylinder may have a better noise abatement result, but the specific installation site may be a determinant.

For systems under a lot of pressure, the noise generated may be great and a single noise abatement device 20 may not be sufficient to achieve a desired result. More than one device may be used and various arrangements may be possible.

FIG. 6 may be illustrative of a two chambered device 31, one chamber may be set on top of the other in vertical arrangement so that the two chambers together constitute a single unit. In such a system the diameter of both inner cylinders may be the same as that of the conduit, as may be the diameter of the internal exit port 32 (through which the fluid passes from the lower chamber 33 to the upper chamber 34) and the flow inlet and flow outlet. By maintaining equality in these dimensions, the pressure of the fluid exiting the device 31 is the same as the pressure when it enters, and the integrity of the fluid flow system is not compromised.

Figure 8:
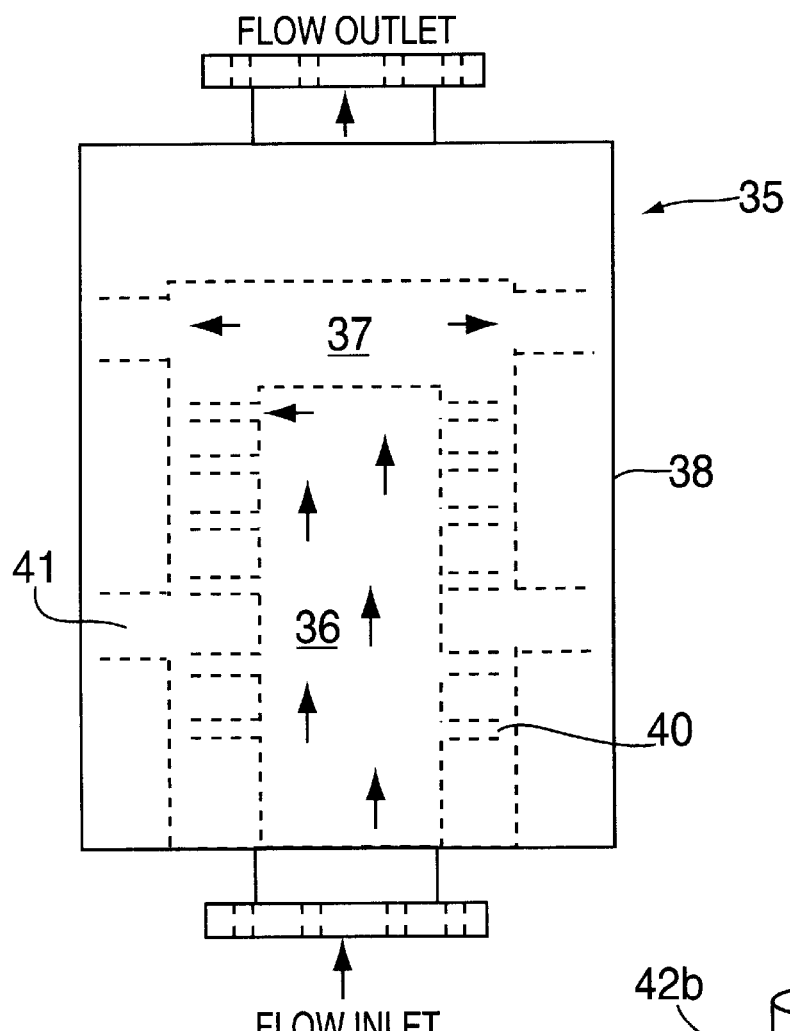
FIG. 8 is a schematic diagram of a double unit (one within the other) in vertical orientation for noise abatement.
Figure 9:
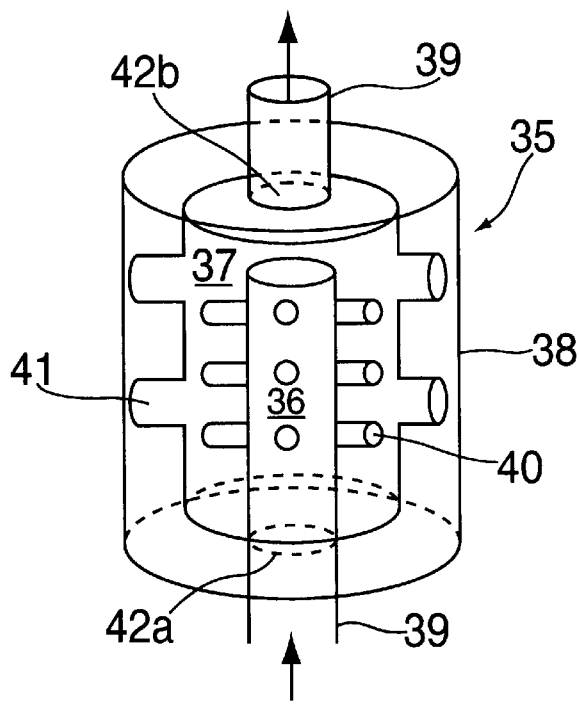
FIG. 9 is a three dimensional schematic view of the device of FIG. 8.

The same noise abatement effect may be obtained from a device having two interior cylinders, one within the other as seen in FIGS. 8 and 9 and may be referred to as the duplicated principal or the triple 35. The triple 35 may have an inner cylinder 36, a middle cylinder 37 and an outer cylinder 38. The diameter of the inner cylinder 36 may be the same as that of the conduit 39. The inner cylinder 36 may have an opening 42a at the bottom that is contiguous with the conduit 39 and may have a series of small nozzles 40 projecting from its exterior wall at 90° angles as previously described. The middle cylinder 37 may also have a series of nozzles 41 projecting from its exterior wall at 90° angles, but the nozzles 41 of the middle cylinder may be fewer and larger in diameter than those of the inner cylinder 36, and therefore may be set farther apart. In both cylinders the nozzles may be symmetrically arranged, both radially and longitudinally.

The sum of the cross sectional areas of the nozzles 40 of the inner clyinder 36 may be equal to or greater than the cross sectional area of the conduit 39 and the sum of the cross sectional areas of the nozzles 41 of the middle cylinder 37 may also be equal to or greater than the cross sectional area of the conduit 39.

The top of the inner cylinder 36 and the top and bottom of the middle cylinder 37 may be closed. The fluid may enter the inner cylinder 36 from the conduit through the entry port 42a. It may then exit the inner cylinder 36 through the nozzles 40 and pass directly into the middle cylinder 37. From there the fluid may exit the middle cylinder 37 through the larger nozzles 41, and finally exit the outer cylinder 38 and re-enter the conduit 39 through an exit port 42b in the top of the outer cylinder 38. This exit port 42b may be of the same diameter as the conduit 39.

Careful construction of the cylinders, attention to the dimensions of the nozzles, and making the diameters of the inner cylinder 36 and the entry port 42a and exit port 42b the same as the diameter of the conduit 39 may maintain constant pressure within the fluid flow system. The force of the fluid against the inner walls of the middle and outer cylinders causes the fluid to be temporarily dispersed into small droplets and may change the dynamics such that the noise usually associated with the flow of a fluid under pressure may be diminshed or eliminated completely.

In addition to the diminishment of the noise associated with fluid flow systems, it may sometimes be necessary to separate the components of a fluid mixture. This may often be a requirement when a gas is dispersed within a liquid. The separation may be accomplished using the basic concept of the instant invention with a simple modification, the addition of a drain or liquid outlet at or near the lower portion of the outer cylinder. The liquid component or components may be removed through such the liquid outlet while the gas may rise and exit through the exit port at the top of the outer cylinder. The system's own pressure may assist in the removal of the gaseous components through the exit port while the force of gravity may assist in the settling of the liquid components at the lower portion of the outer cyinder.

Figure 4:
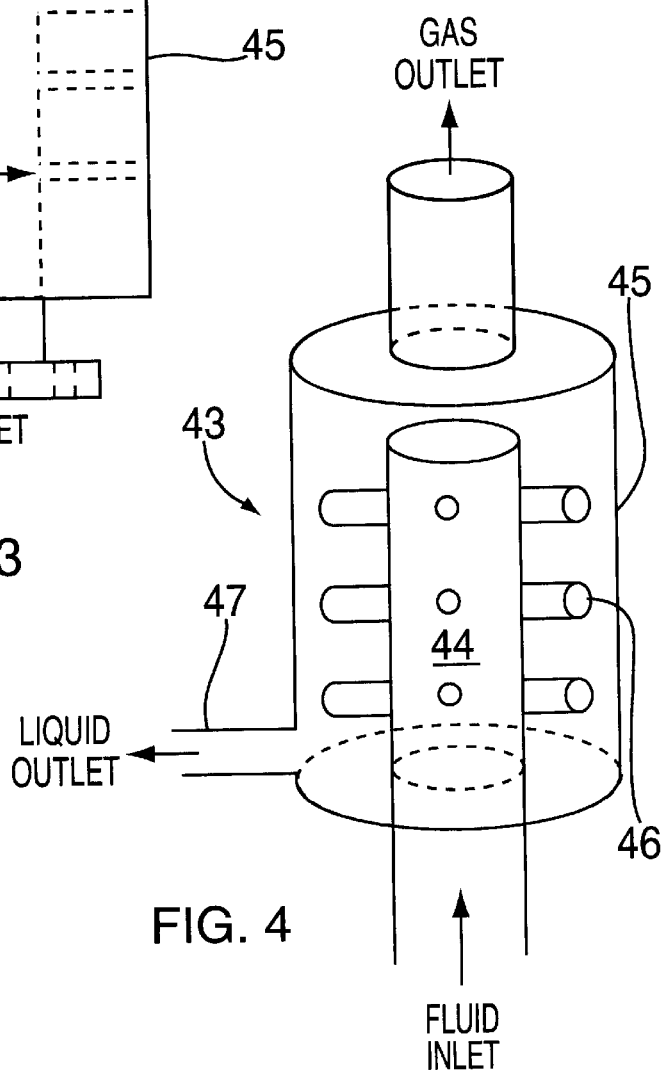
FIG. 4 is a three dimensional schematic view of the device of FIG. 3.

A noise abatement device with gas separation capability may be seen in FIGS. 3 and 4. The dimensions and configurations of the gas separator 43, that is, inner clyinder 44, outer cylinder 45, and nozzles 46, may be the same as in the simple noise abatement device 20, and the number of nozzles may be calculated in the same manner. The type of nozzle used in the gas separator 43 may depend upon the liquid involved and the pressure within the system. If a flush cut nozzle is used the fluid may be directed against the wall of the outer cylinder 45 with considerable force which may cause the dispersion of the fluid into very small droplets facilitating the separation of the gas. The use of a nozzle with the end cut at an angle and facing downward, FIG. 12, directs the liquid downward and there may be less force of impact with the opposing wall. The liquid outlet 47 may be located at or near the bottom of the outer cylinder 45 so that all or most of the liquid may be removed from the gas separator 43.

The gas separator 43 seen in FIGS. 3 and 4 is shown in vertical orientation. A horizontal gas separator 48 is seen in FIG. 5. To prevent a build-up of liquid at the bottom 49 of the outer cylinder 50, more than one liquid outlet may be utilized. Such systems may be quite effective in the removal of air from fluid mixtures and may be quite efficient in removing air from an air-water mixture. The separations are effected while at the same time eliminating any noise generated by the fluid flow.

The duplicated principal may also be applied to the separator unit with the result being a triple separator 51, FIGS. 10 and 11. The structure and proportions of the triple separator 51 may be the same as those of the triple noise abatement unit 35 with the addition of the liquid outlet 52 located at or near the bottom of the outermost cylinder 55. The fluid may be directed into the inner cylinder 53 where it may exit through the many small nozzles 56 and strike the wall of the middle cylinder 54 where it may thereafter be directed through the larger nozzles 57 into the outer cylinder 55. In each stage more of the air or other gas may be separated out and rise so that more gas may exit through the upper nozzles and more liquid through the lower nozzles, also aided by gravity. Finally, most of the gas may leave the triple separator 51 through the exit port 58 at the top of the outer cylinder 55 while the liquid may leave through the liquid outlet 52 at the bottom of the outer cylinder 55. It must be borne in mind that the triple separator 51 functions as a noise abatement device as well as a gas separator.

Figure 13:
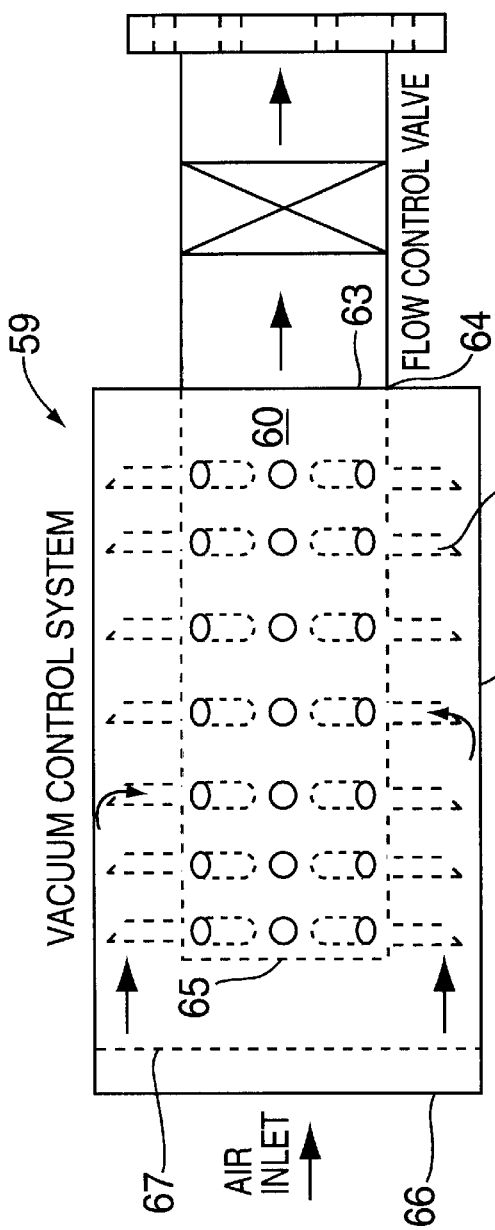
FIG. 13 is a schematic diagram of a variation of the device for use as a bleeder for a vacuum system.

The noise abatement principle of the instant invention, with certain modifications, may have added advantages in specific systems. Bleeder valves used in vacuum systems to control the amount of air entering the line often cause loud hissing noises. A modified unit may be utilized in conjunction with a flow control valve to control and filter the air entering a vacuum line without the usual noise. Such a bleeder unit or vacuum control system 59 is shown in FIG. 13. The vacuum control system 59 may have an inner cylinder 60 and an outer cylinder 61. The inner cylinder 60 may be equipped with nozzles 62 the ends of which may be cut at an angle, typically 45°, facing toward its proximal end 64.

There may be an exit port 63 in the proximal end 64 that leads to the flow control valve and then into the vacuum line (not shown). The distal end 65 of the inner cylinder 60 may be closed. The distal end 66 of the outer cylinder 61 may be open in the form of a porous material through which the air is permitted to enter. Just inside the distal end 66 and covering the entire cross sectional area of the outer cylinder 61 may be situated an air filter 67 to trap any particulates so none may enter the vacuum line. The orientation of the cut angle of the nozzles 62 may also prevent any particulates from entering the vacuum line.

Figure 14:
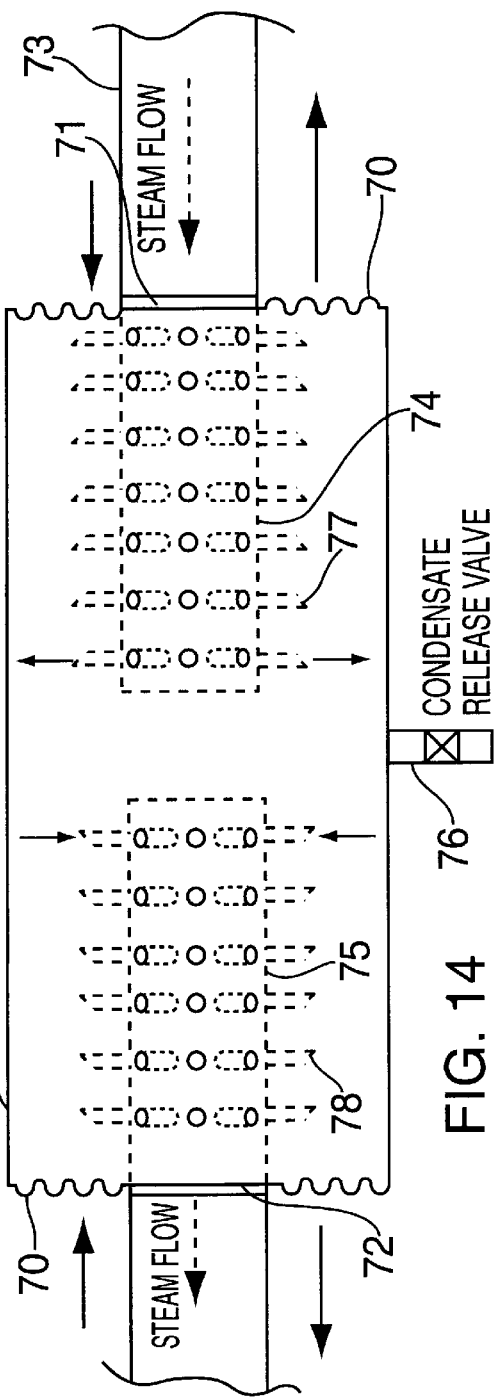
FIG. 14 is a schematic diagram of a variation of a double unit in horizontal orientation for noise abatement and pressure control in a steam conduit system.

Fluid flow systems often producing the most noise may be steam lines where there may be excessive expansion and contraction of the conduits caused by the temperature variations associated with steam generating systems. A steam control system 68 encompassing the device of the instant invention may be interposed within such a steam generating system. Referring to FIG. 14, there may be an outer cylinder 69 having its proximal and distal ends closed with a corrugated or rippled material 70 capable of moderate expansion and contraction. There may be two inner cylinders, a proximal cylinder 74, having an entry port 71 at its proximal end, and being closed its distal end; and a distal cylinder 75, having an exit port 72 at its distal end, and being closed at its proximal end. The entry port 71 and exit port 72 may both have diameters equal to that of the steam conduit 73.

The proximal cylinder 74 and distal cylinder 75 may each have a series of symmetrically arranged nozzles 77 and 78 as previously described. The nozzles in the steam control system 68 may all be cut at an angle, with the open end of the nozzles 77 of the proximal cylinder 74 facing the proximal end of the steam control system 68 and the open end of the nozzles 78 of the distal cylinder 75 facing the distal end of the steam control system 68. There may be a valve 76 centrally situated in the bottom of the steam control system 68 through which condensate may be removed as necessary.

The steam control system 68 may be interposed within the conduit 73 of a steam generating system both to eliminate the noise associated with such systems and to assist in maintaining a constant pressure within the system. Since the conduits 73 in a steam generating system may be subjected to changes in temperature, the rippled material 70 forming the proximal and distal walls of the outer cylinder 69 may expand and contract to equalize the pressure variances resulting from these temperature changes.

The noise abatement device of the instant invention may be placed at any point within a fluid flow system where the noise may be most likely to be generated. This may be in an area where there is a long stretch of conduit, or it may be where there is a change of direction of the conduit, or at the point where the fluid initially inters the conduit. Some systems may require more than one such device. Other systems may benefit from one of the multiple chambered designs. The specific design may also be determined by the space available and/or the amount of noise generated. For already existing systems, the ease of access to the pipeline may dictate the location or locations of one or more device and the design of the device employed. When a noise abatement device is used in a vacuum system it may be placed adjacent to the vacuum pump.

When the separation of a gas from a liquid is also required, the placement requirements may be different. If the separation ability is only needed to remove condensation from an air or other gas transport line, the device may be interposed at some midway location in the conduit. Where the separation of a gas from the fluid is a major consideration, the device may be placed at the point where the conduit is attached to the "production" area, i.e., the beginning of the conduit. For steam generating systems, the device may be located at any point or points where there is excessive vibration in the conduit.

The choice of nozzle size and therefrom the length of the cylinders may be determined by the materials of which the device is to be constructed, with consideration given for the viscosity of the fluid involved. The device of the instant invention may be made of any strong material such as iron, steel, aluminum or other metal or alloy or any one of many plastic or polymeric substances. The material must be able to withstand the internal pressures, temperatures and the forces of fluid impact and also be non-reactive to the fluid itself.

While several embodiments of the instant invention have been illustrated and described in detail, it is to be understood that this invention is not limited thereto and may be otherwise practiced within the scope of the following claims.

What is claimed is:

1. A noise abatement device for use within a fluid flow system the noise abatement device interposed into a main conduit of the fluid flow system, said nose abatement device comprising:

a first chamber having a proximal end and a distal end and being closed at its distal end;

an entrance port in said proximal end for the introduction of the fluid from the main conduit of the fluid flow system;

a plurality of exit nozzles extending horizontally from the exterior of said first chamber for the exit of the fluid therefrom;

a second chamber, larger than said first chamber and containing said first chamber therein, said second chamber having a proximal end and a distal end and being closed at the proximal end; and an exit port in the distal end of the second chamber for the removal of the fluid therefrom;

whereby as the fluid enters the first chamber from the main conduit through the entrance port and leaves the first chamber through the exit nozzles it is caused to be dispersed and to strike the interior wall of the second chamber where it is further dispersed and finally leaves the second chamber through the exit port and re-enters the main conduit of the fluid flow system and whereby the dispersing of said fluid causes a change in the dynamics thereof thus reducing any noise that may have resulted from the fluid flow.

2. A noise abatement device as in claim 1 wherein the first chamber and the second chamber have a common axis.

3. A noise abatement device as in claim 1 wherein the arrangement of the exit nozzles is both radially and longitudinally symmetrical.

4. A noise abatement device as in claim 1 wherein the ends of the exit nozzles arc flush cut.

5. A noise abatement device as in claim 1 wherein the ends of the exit nozzles are cut at an angle.

6. A noise abatement device as in claim 1 wherein the exit nozzles have a right angle bend.

7. A noise abatement device as in claim 1 wherein the sum of the cross sectional areas of the exit nozzles is at least equal to the cross sectional area of a fluid flow system conduit.

8. A noise abatement device as in claim 1 wherein the cross sectional area of the entrance port is equal to the cross sectional area of a fluid flow system conduit.

9. A noise abatement device as in claim 1 wherein the cross sectional area of the entrance port is equal to the cross sectional area of the exit port.

10. A noise abatement device as in claim 1 wherein the cross sectional area of the exit port is equal to the cross sectional area of a fluid flow conduit.

11. A noise abatement device as in claim 1 wherein the cross sectional area of the first chamber is equal to the cross sectional area of a fluid flow conduit.

12. A noise abatement device as in claim 1 wherein the volume of the second chamber is at least equal to the volume of the first chamber.

13. A noise abatement device as in claim 1 further comprising:
- a third chamber disposed between the first chamber and the second chamber, said third chamber having a proximal end and distal end and being closed at said proximal end and at said distal end, said third chamber containing said first chamber; and
- a plurality of exit nozzles extending horizontally from the exterior of said third chamber for the exit of said fluid therefrom;
- whereby as the fluid enters the first chamber through the entrance port, leaves the first chamber through the exit nozzles, and enters the third chamber, it is caused to be dispersed and to strike the interior wall of the third chamber where it is further dispersed and thereafter leaves the third chamber through the exit nozzles and strikes the interior wall of the second chamber where it is still further dispersed and finally leaves the second chamber through the exit port and re-enters the fluid flow system and whereby the dispersing of said fluid causes a change in the dynamics thereof thus reducing any noise that may have resulted from the fluid flow.

14. A noise abatement device as in claim 13 wherein the sum of the cross sectional areas of the exit nozzles in the third chamber is at least equal to the cross sectional area of a fluid flow system conduit.

15. A noise abatement device as in claim 13 wherein the first chamber, the second chamber and the third chamber all have a common axis.

16. A noise abatement device for use within a fluid flow system comprising:
- a first chamber having a proximal end and a distal end and being closed at its distal end;
- an entrance port in said proximal end for the introduction of the fluid from the fluid flow system;
- a plurality of exit nozzles extending horizontally from the exterior of said first chamber for the exit of said fluid therefrom;
- a second chamber, larger than said first chamber and containing said first chamber therein, said second chamber having a proximal end and a distal end and being closed at said proximal end and having an exit port in said distal end for the removal of the fluid from said second chamber;
- a third chamber disposed at the distal end of said the second chamber, said third chamber having a proximal end and distal end and having an opening in said proximal end contiguous with the exit port of said second chamber to receive the fluid from said second chamber and being closed at said distal end;
- a plurality of exit nozzles extending horizontally from the exterior of said third chamber for the exit of said fluid therefrom; and
- a fourth chamber, adjacently disposed to said second chamber, larger than said third chamber, and containing said third chamber therein, said fourth chamber having a proximal end and a distal end and being closed at said proximal end and having an exit port in said distal end for the removal of the fluid from said fourth chamber;
- whereby as the fluid enters the first chamber through the entrance port and leaves the first chamber through the exit nozzles it is caused to be dispersed and to strike the interior wall of the second chamber where it is further dispersed and thereafter leaves the second chamber through the exit port and enters the third chamber from which it leaves through the exit nozzles where it is further dispersed and strikes the interior wall of the fourth chamber where it is still further dispersed and finally leaves the fourth chamber by the the exit port and re-enters the fluid flow system and whereby the dispersing of said fluid causes a change in the dynamics thereof thus reducing any noise that may have resulted from the fluid flow.

17. A noise abatement device as in claim 16 wherein the cross sectional area of the first chamber and of the third chamber are both equal to the cross sectional area of a fluid flow system conduit.

18. A noise abatement device as in claim 16 wherein the cross sectional areas of the entry ports and the exit ports are each equal to the cross sectional area of a fluid flow system conduit.

19. A noise abatement device as in claim 16 wherein the sums of the cross sectional areas of the nozzles of the first chamber and of the third chamber are each at least equal to the cross sectional area of a fluid flow system conduit.

20. A noise abatement device as in claim 16 wherein the first chamber and third chamber are cylinders.

21. A noise abatement device as in claim 16 wherein the first chamber and third chamber arc of the same dimensions.

22. A noise abatement device as in claim 16 wherein the second chamber and fourth chamber are cylinders.

23. A noise abatement device as in claim 16 wherein the second chamber and fourth chamber are of the same dimensions.

24. A noise abatement device as in claim 16 wherein the arrangement of the exit nozzles of the first chamber and of the third chamber are radially and longitudinally symmetric.

25. A noise abatement device as in claim 16 wherein the first chamber, the second chamber, the third chamber and the fourth chamber have a common axis.

26. A device for use within a fluid flow system to reduce the noise associated with such fluid flow systems and to separate gas components from liquid components comprising:
- a first chamber having a proximal end and a distal end and being closed at its distal end;
- an entrance port in said proximal end for the introduction of the fluid from the fluid flow system;
- a plurality of exit nozzles extending horizontally from the exterior of said first chamber for the exit of said fluid therefrom;
- a second chamber, larger than said first chamber and containing said first chamber therein, said second chamber having a proximal end and a distal end and being closed at said proximal end;

an exit port in the distal end of said second chamber for the removal of the gas components from said second chamber; and at least one liquid drain in said second chamber for the removal of the liquid components from said second chamber;

whereby as the fluid enters the first chamber through the entrance port and leaves the first chamber through the nozzles it is caused to be dispersed and to strike the interior wall of the second chamber where it is further dispersed causing the gas components to become separated from the liquid components such that the gas components leave the second chamber through the exit port and re-enter the fluid flow system and the liquid components leave the second chamber through the liquid drain and whereby the dispersing and separation of the components of said fluid also causes a change in the dynamics thereof thus reducing any noise that may have resulted from the fluid flow.

27. A device as in claim 26 wherein the first chamber and the second chamber have a common axis.

28. A device as in claim 26 further comprising:

a third chamber disposed between the first chamber and the second chamber, said third chamber having a proximal end and distal end and being closed at said proximal end and at said distal end, said third chamber containing said first chamber; and a plurality of exit nozzles extending horizontally from the exterior of said third chamber for the exit of said liquid components and said gas components therefrom;

whereby as the fluid enters the first chamber through the entrance port and leaves the first chamber through the exit nozzles it is caused to be dispersed and to strike the interior wall of the third chamber where it is further dispersed and partially separated into gas components and liquid components which thereafter leave the third chamber through the exit nozzles and strike the interior wall of the second chamber where they are still further dispersed and further separated into gas components and liquid components such that the gas components leave the second chamber through the exit port and re-enter the fluid flow system and the liquid components leave the second chamber through the liquid drain and whereby the dispersing and separation of the components of said fluid causes a change in the dynamics thereof thus reducing any noise that may have resulted from the fluid flow.

29. A device for use within a vacuum system through which to bleed air into said vacuum system and to reduce the noise associated with such vacuum system comprising:

a first chamber having a proximal end and a distal end, being closed at its proximal end and having air inlet means at its distal end;

a second chamber, smaller than said first chamber such that said second chamber is contained within said first chamber, said second chamber having a proximal end and a distal end and being closed at said distal end;

a plurality of nozzles extending horizontally from the exterior of said second chamber for the introduction of the air into said second chamber;

an air exit conduit in the proximal end of said second chamber for the exit of air from said second chamber and for the introduction of the air into the vacuum system; and valve means within said air exit conduit for controlling the amount of air permitted to enter the vacuum system;

whereby the air caters the first chamber through the air inlet means, enters the second chamber through the nozzles, and leaves the second chamber through the air exit conduit and the valve means causing a change in the dynamics of the air flow and thus reducing noise that may have resulted therefrom.

30. A device as in claim 29 further comprising:

air filter means disposed in the first chamber adjacent the distal end for removing foreign matter from the entering air.

31. A device as in claim 29 wherein the arrangement of the nozzles is radially and longitudinally symmetric.

32. A device as in claim 29 wherein the ends of the nozzles are cut at an angle such that their open ends face the proximal end of the second chamber.

33. A device as in claim 32 wherein the ends of the nozzles are cut at a 45° angle.

34. A device for use within a steam generating system to reduce the noise associated with such systems, said device comprising:

a first chamber having a proximal end and a distal end, said first chamber having both ends closed by panels, said panels being reversibly expandable under conditions of variable temperature and pressure;

a second chamber, situated at the proximal end of said first chamber and being smaller than said first chamber such that said second chamber is contained within said first chamber, said second chamber having a proximal end and a distal end and being closed at said distal end;

steam inlet means at the proximal end of said second chamber for introduction of steam into said second chamber;

a plurality of nozzles extending horizontally from the exterior of said second chamber for the exit of the steam from said second chamber;

a third chamber, situated at the distal end of said first chamber and being smaller than said first chamber such that said third chamber is contained within said first chamber, said third chamber having a proximal end and a distal end and being closed at said proximal end;

a plurality of nozzles extending horizontally from the exterior of said third chamber for the introduction of the steam into said third chamber; and steam exit means at the distal end of said third chamber for removal of steam from said third chamber;

whereby the steam enters the second chamber through the steam inlet means, leaves the second chamber through the nozzles, enters the first chamber where the pressure of the steam flow is equalized by means of the panels, and thereafter leaves the first chamber and enters the third chamber through the nozzles and exits the third chamber through the steam exit means, said steam transfers causing a change in the dynamics of the steam flow and thus reducing noise that may have resulted from the steam flow.

35. A device as in claim 34 wherein the ends of the nozzles of the second chamber and the ends of the nozzles of the third chamber are cut at angles.

36. A device as in claim 35 wherein the ends of the nozzles are cut at 45° angles.

37. A device as in claim 35 wherein the cut ends of the nozzles of the second chamber face the proximal end of the second chamber and the cut ends of the nozzles of the third chamber face the distal end of the third chamber.

38. A device as in claim 34 wherein the arrangement of the nozzles of the second chamber and of the third chamber are radially and longitudinally symmetric.

39. A device as in claim 34 further comprising valve means in the first chamber for the removal of condensate therefrom.

40. A device as in claim 34 wherein the first chamber, the second chamber and the third chamber have a common axis.

* * * * *